United States Patent
Huang

(10) Patent No.: US 8,570,335 B2
(45) Date of Patent: Oct. 29, 2013

(54) MOBILE DEVICE AND METHOD FOR DISPLAYING THUMBNAILS ON THE MOBILE DEVICE

(75) Inventor: Tze-Wei Huang, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 1149 days.

(21) Appl. No.: 12/498,283

(22) Filed: Jul. 6, 2009

(65) Prior Publication Data

US 2010/0060655 A1 Mar. 11, 2010

(30) Foreign Application Priority Data

Sep. 5, 2008 (CN) .......................... 2008 1 0304380

(51) Int. Cl.
 *G06F 13/00* (2006.01)
 *G06T 1/60* (2006.01)
(52) U.S. Cl.
 USPC ............................ 345/537; 345/530; 345/536
(58) Field of Classification Search
 USPC .......................................... 345/530, 536, 537
 See application file for complete search history.

(56) References Cited

U.S. PATENT DOCUMENTS

| 5,519,825 | A  | * | 5/1996  | Naughton et al. | ............ 345/473   |
| 6,333,752 | B1 | * | 12/2001 | Hasegawa et al. | ............ 715/764   |
| 7,619,953 | B2 | * | 11/2009 | Shiina          | ........... 369/47.15  |
| 8,134,607 | B2 | * | 3/2012  | Tsubakihara     | ............ 348/220.1 |
| 2008/0129757 | A1 | * | 6/2008 | Tanaka et al.  | ............ 345/660   |
| 2008/0235285 | A1 | * | 9/2008 | Della Pasqua   | ............ 707/104.1 |

\* cited by examiner

*Primary Examiner* — Joni Richer
(74) *Attorney, Agent, or Firm* — Altis & Wispro Law Group, Inc.

(57) ABSTRACT

A method for displaying thumbnails on a mobile device includes allocating at least two buffers in a storage system of the mobile device, where the at least two buffers comprise a displayed thumbnail buffer and a current thumbnail buffer. Indices of the thumbnails on are displayed on a display screen of the mobile device, and thumbnails from the displayed thumbnail buffer are read if the thumbnails correspond to the indices are found in the displayed thumbnail buffer. In addition, the method further includes reading the thumbnails from the current thumbnail and displaying the thumbnails on the display screen of the mobile device.

13 Claims, 3 Drawing Sheets

| Display screen | |
|---|---|
| 8 | 9 |
| 10 | 11 |

A

| Displayed thumbnail buffer | |
|---|---|
| 6 | 7 |
| 8 | 9 |
| 5 | 4 |
| 10 | 11 |

B

| Current thumbnail buffer | |
|---|---|
| 8 | 9 |
| 10 | 11 |
| 7 | 6 |
| 0 | 1 |

MOBILE DEVICE AND METHOD FOR DISPLAYING THUMBNAILS ON THE MOBILE DEVICE

BACKGROUND

1. Technical Field

Embodiments of the present disclosure relate to the field of displaying images on an electronic device, and more particularly to a mobile device and a method for displaying thumbnails on the mobile device.

2. Description of Related Art

Generally, a mobile device includes an image browser and a display screen. The image browser usually displays a set number of images on the display screen at one time according to a resolution of the display screen. Usually, the images are displayed in the image browser in form of a plurality of thumbnails, which are scaled-down images of source images to facilitate browsing and identification. The user can select a desired thumbnail of the image to display the image in full-screen, and set the image as wallpaper on the display screen of the mobile device. Therefore, it is needed to design an efficient and smooth picture browser to browse the thumbnails of the images. However, it is difficult to provide an efficient and smooth image browser in a low-cost mobile device since it has low computing power and storage resources.

Therefore, there is a mobile device and a method for displaying thumbnails of the mobile device to overcome the above-mentioned problems.

BRIEF DESCRIPTION OF THE DRAWINGS

FIG. 3 is a diagram showing a display screen, a displayed thumbnail buffer, and a current thumbnail buffer of the mobile device of FIG. 1.

DETAILED DESCRIPTION

Figure 1:
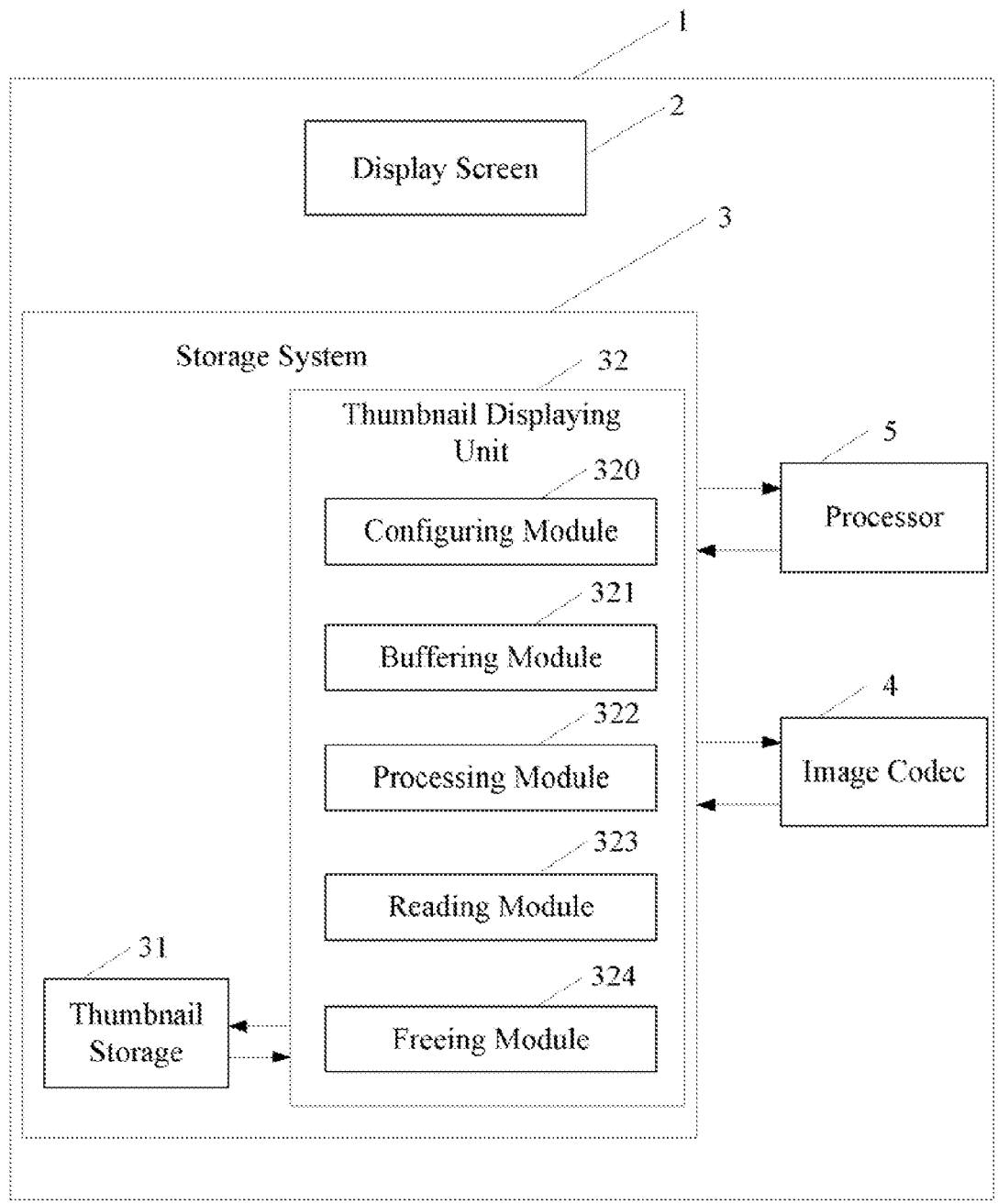
FIG. 1 is a block diagram of one embodiment of a mobile device.

FIG. 1 is a block diagram of one embodiment of a mobile device 1. The mobile device 1 may be a portable wireless device, such as a mobile phone, a personal digital assistant (PDA), and the like.

In the embodiment, the mobile device 1 includes a display screen 2, a storage system 3, an image codec 4, and a processor 5. The storage system 3 includes a thumbnail storage 31, and a thumbnail displaying unit 32. The storage system 3 has stored instructions that are executed by the mobile device 1, to perform a method for displaying thumbnails on the mobile device 1.

The thumbnail storage 31 may be a non-volatile memory and is operable to store thumbnails of images in the mobile device 1. The images may be taken from a camera module, transferred from a computer, or an external storage device. In one embodiment, the resolution of each image is at least 640×480 pixels.

The thumbnail displaying unit 32 may include a configuring module 320, a buffering module 321, a processing module 322, a reading module 323, and a freeing module 324.

The configuring module 320 is operable to allocate a memory space for at least two buffers in the storage system 3 and a buffer size of each of the buffers. In the embodiment, the buffers may be a displayed thumbnail buffer and a current thumbnail buffer. The displayed thumbnail buffer stores the thumbnails displayed previously on the display screen 2. The current thumbnail buffer stores the thumbnails currently displayed and to-be displayed on the display screen 2. Generally speaking, the buffer size may be defined by the following properties: a total number of thumbnails stored in each buffer, and the thumbnail format. In the embodiment, referencing to FIG. 3A, four thumbnails are listed on the display screen 2 at one time, two thumbnails per row. Referencing to FIG. 3B and FIG. 3C, the total number of thumbnails stored in each buffer may be eight thumbnails. The thumbnail format may be a compression format or a raw display data format. The properties of each thumbnail may include an index of the thumbnail and a memory address of a full image of the thumbnail or a link/reference to the full image of the thumbnail. A full image and a thumbnail of the full image have a same index.

Referencing to FIG. 3A, the indices of the images are displayed on the display screen 2 when a user scrolls up or down when browsing images in an image folder, such as a "pictures" or a "Camera album" folder in the display screen 2. The indices may correspond to the thumbnails displayed previously on the display screen 2, or one upper row and lower row of the display screen 2 being currently displayed. The indices 8, 9, 10, 11 are displayed in the display screen 2. Referencing to FIG. 3B, the indices 8, 9, 10, 11 are stored in the displayed thumbnail buffer.

The buffering module 321 is operable to find the thumbnail of each index displayed on the display screen 2. Referencing to FIG. 3B and FIG. 3C, the buffering module 321 reads one of the indices and searches for the thumbnail corresponding to the one of the indices in the displayed thumbnail buffer. The buffering module 321 reads the thumbnail from the displayed thumbnail buffer and copies the thumbnail into the current thumbnail buffer if the thumbnail corresponding to the one of the indices is found in the displayed thumbnail buffer.

The buffering module 321 searches for the thumbnail corresponding to the one of the indices in the thumbnail storage 31 if the thumbnail corresponding to one of the indices is not found in the displayed thumbnail buffer. The buffering module 321 reads the thumbnail from the thumbnail storage 31 and copies the thumbnail into the current thumbnail buffer if the thumbnail corresponding to one of the indices is found in the thumbnail storage 31.

The buffering module 321 is operable to send a create thumbnail command to the image codec 4 if the thumbnail corresponding to the one of the indices is not found in the displayed thumbnail buffer nor the thumbnail storage 31. The image codec 4 creates a thumbnail of a full image corresponding to the one of the indices.

The processing module 322 is operable to copy the thumbnail created by the image codec 4 into the current thumbnail buffer after the image codec 4 creates the thumbnail of the full image corresponding to the one of the indices.

The reading module 323 is operable to read the thumbnails from the current thumbnail buffer and display the thumbnails on the display screen 2. If the thumbnail is not in the current thumbnail buffer, the reading module 323 determines that the image codec 4 is creating a thumbnail of a full image corresponding to the one of the indices.

The freeing module 324 is operable to free the memory space occupied by the two buffers if the configuring module 320 needs to allocate the two buffers again.

Figure 2:
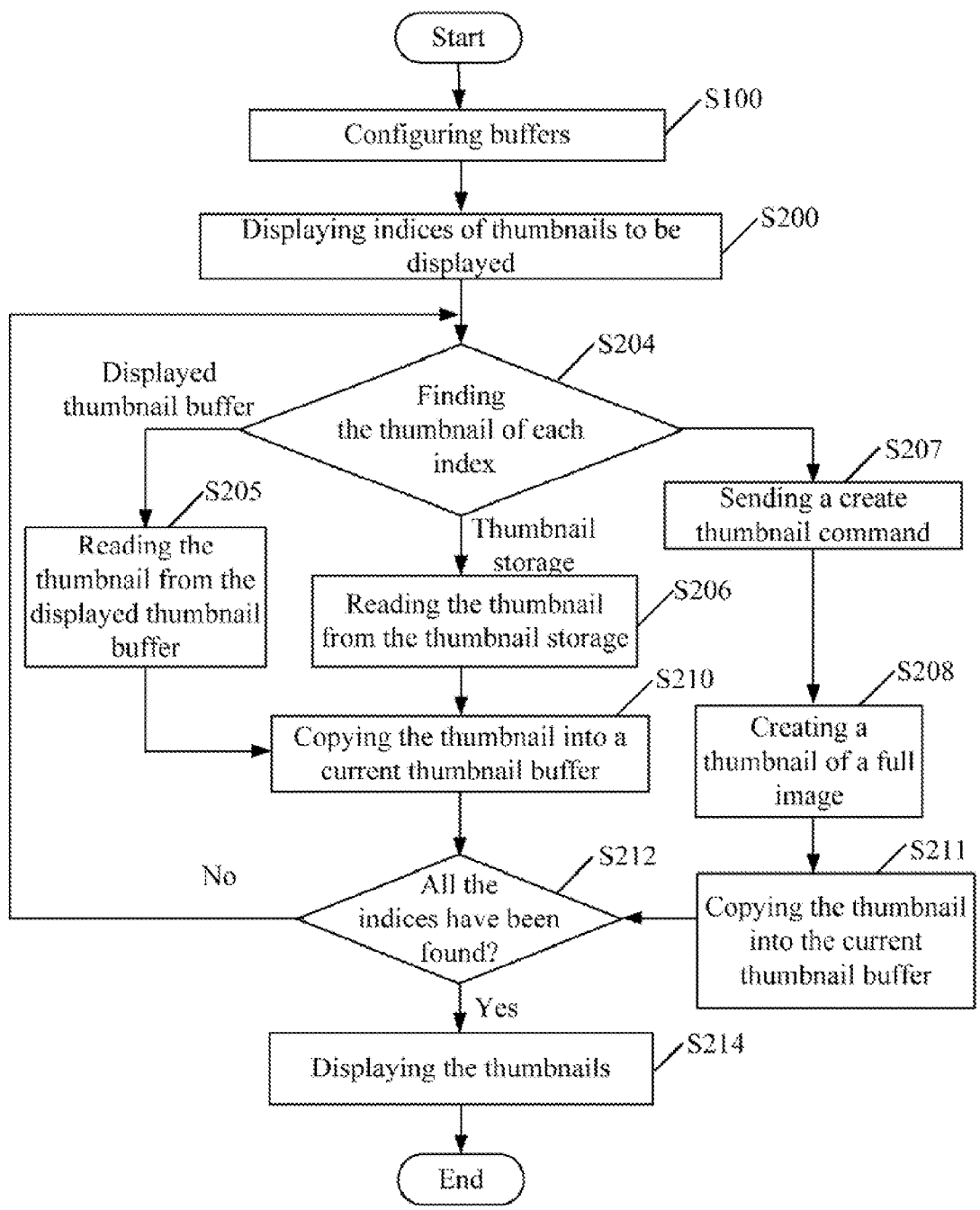
FIG. 2 is a flowchart of one embodiment of a method for displaying thumbnails on the mobile device of FIG. 1.

FIG. 2 is a flowchart of one embodiment of a method for displaying thumbnails of the mobile device 1. In block S100, the configuring module 320 allocates a memory space for the displayed thumbnail buffer and the current thumbnail buffer in the storage system 3. The displayed thumbnail buffer stores the thumbnails displayed previously on the display screen 2. The current thumbnail buffer stores the thumbnails currently displayed and to-be displayed on the display screen 2. The configuring module 320 further configures a buffer size of each buffer, which may be defined by the following properties: a total number of thumbnails stored in each buffer, and the thumbnail format. In the embodiment, referencing to FIG. 3A, four thumbnails are listed on the display screen 2 at one time, two thumbnails per row. Referencing to FIG. 3B and FIG. 3C, the total number of thumbnails stored in each buffer may be eight thumbnails. The thumbnail format may be a compression format or a raw display data format. The properties of each thumbnail stored in each buffer may include an index of the thumbnail and a memory address of a full image of the thumbnail or a link/reference to the full image of the thumbnail.

In block S200, the indices of the images are displayed on the display screen 2 when a user scrolls up or down when browsing the images in an image folder, such as a "pictures" or a "Camera album" folder in the display screen 2. In block S204, the buffering module 321 finds the thumbnail of each index displayed in the display screen 2. The buffering module 321 reads one of the indices and searches for the thumbnail corresponding to the one of the indices in the displayed thumbnail buffer. If the thumbnail corresponding to the one of the indices is found in the displayed thumbnail buffer, in block S205, the buffering module 321 reads the thumbnail from the displayed thumbnail buffer, and the procedure goes to block S210 as described below.

Otherwise, if the thumbnail corresponding to the one of indices is not found in the displayed thumbnail buffer, the buffering module 321 searches for the thumbnail corresponding to the one of the indices in the thumbnail storage 31. If the thumbnail corresponding to the one of the indices is found in the thumbnail storage 31, in block S206, the buffering module 321 reads the thumbnail from the thumbnail storage 31, and the procedure goes to block S210.

If the thumbnail corresponding to the one of the indices is not found in the displayed thumbnail buffer nor the thumbnail storage 31, in block S207, the buffering module 321 sends a create thumbnail command to the image codec 4. In block S208, the image codec 4 creates a thumbnail of a full image corresponding to the one of the indices.

In block S211, the processing module 322 copies the thumbnail created by the image codec 4 into the current thumbnail buffer after the image codec 4 creates the thumbnail of the full image corresponding to the one of the indices, and the procedure goes to block S212.

In block S210, the buffering module 321 copies the thumbnail into the current thumbnail buffer.

In block S212, the buffering module 321 determines whether all the indices displayed on the display screen 2 have been found. The procedure goes to block S204 if one of the indices has not been found.

Otherwise, if all the indices have been found, in block S214, the reading module 323 reads the thumbnails from the current thumbnail buffer and displays the thumbnails on the display screen 2. When the reading module 323 does not read the thumbnail from the current thumbnail buffer, the reading module 323 determines that the image codec 4 is creating a thumbnail of the full image corresponding to the one of the indices, and the processing module 322 would copy the thumbnail created by the image codec 4 to the current thumbnail buffer after the image codec 4 creates the thumbnail of the full image corresponding to the one of the indices.

When the at least two buffers needs to be allocated again, the freeing module 324 frees the memory space occupied by the at least two buffers, and the configuring module 320 configures the at least two buffers.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile device, comprising:
   a display screen;
   a storage system comprising a thumbnail storage;
   at least one processor; and
   a thumbnail displaying unit that is included in the storage system and comprising one or more computerized operations to be executed by the at least one processor, the thumbnail displaying unit comprising:
   a configuring module that allocates a memory space for at least two buffers in the storage system, the at least two buffers comprising a displayed thumbnail buffer that stores thumbnails displayed previously on the display screen, and a current thumbnail buffer that stores thumbnails currently displayed and to-be displayed on the display screen;
   under the condition that the display screen displays indices of images when browsing the images in an image folder, a buffering module that reads the indices displayed on the display screen, and reads the thumbnails corresponding to the indices from the displayed thumbnail buffer when the thumbnails corresponding to the indices are found in the displayed thumbnail buffer, and copies the thumbnails into the current thumbnail buffer; and
   a reading module that reads the thumbnails from the current thumbnail buffer, and displays the thumbnails on the display screen.

2. The mobile device according to claim 1, wherein the thumbnail displaying unit further comprises a freeing module that frees the memory space occupied by the at least two buffers.

3. The mobile device according to claim 1, wherein the buffering module reads the thumbnails from the thumbnail storage of the storage system when the thumbnails corresponding to the indices displayed on the display screen are not found in the displayed thumbnail buffer and the thumbnails corresponding to the indices are found in the thumbnail storage, and copies the thumbnails into the current thumbnail buffer.

4. The mobile device according to claim 1, wherein the thumbnail displaying unit further comprises an image codec that creates a thumbnail of a full image corresponding to one of the indices displayed on the display screen when the thumbnail corresponding to the one of the indices is not found in the displayed thumbnail buffer nor the thumbnail storage.

5. The mobile device according to claim 4, wherein the thumbnail displaying unit further comprises a processing module that copies the thumbnail created by the image codec into the current thumbnail buffer.

6. A method for displaying thumbnails on a mobile device, the mobile device comprising a storage system that has a thumbnail storage, the method comprising:
   allocating a memory space for at least two buffers in a storage system of the mobile device, the at least two buffers comprising a displayed thumbnail buffer that stores thumbnails displayed previously on a display screen of the mobile device, and a current thumbnail buffer that stores thumbnails currently displayed and to-be displayed on the display screen;

under the condition that the display screen displays indices of images when browsing the images in an image folder, reading the indices on the display screen;

reading the thumbnails corresponding to the indices from the displayed thumbnail buffer when the thumbnails corresponding to the indices are found in the displayed thumbnail buffer;

copying the thumbnails into the current thumbnail buffer; and reading the thumbnails from the current thumbnail buffer and displaying the thumbnails on the display screen.

7. The method according to claim 6, further comprising:
freeing the memory space occupied by the at least two buffers.

8. The method according to claim 6, further comprising:
reading the thumbnails from the thumbnail storage of the storage system when the thumbnails corresponding to the indices are not found in the displayed thumbnail buffer and the thumbnails corresponding to the indices are found in the thumbnail storage; and
copying the thumbnails into the current thumbnail buffer.

9. The method according to claim 6, further comprising:
sending a create thumbnail command to an image codec of the mobile device when the thumbnail corresponding to one of the indices is not found in the displayed thumbnail buffer nor the thumbnail storage; and
creating a thumbnail of a full image corresponding to the one of the indices by the image codec, and copying the thumbnail created by the image codec into the current thumbnail buffer.

10. A non-transitory storage medium having stored thereon instructions that, when executed by a mobile device, causing the mobile device to perform a method for displaying thumbnails on the mobile device, the mobile device comprising a storage system that has a thumbnail storage, the method comprising:
allocating a memory space for at least two buffers in a storage system of the mobile device, the at least two buffers comprising a displayed thumbnail buffer that stores thumbnails displayed previously on a display screen of the mobile device, and a current thumbnail buffer that stores thumbnails currently displayed and to-be displayed on the display screen;

under the condition that the display screen displays indices of images when browsing the images in an image folder, reading the indices on the display screen;

reading the thumbnails corresponding to the indices from the displayed thumbnail buffer when the thumbnails corresponding to the indices are found in the displayed thumbnail buffer;

copying the thumbnails into the current thumbnail buffer; and reading the thumbnails from the current thumbnail buffer and displaying the thumbnails on the display screen.

11. The non-transitory storage medium according to claim 10, wherein the method further comprises:
freeing the memory space occupied by the at least two buffers.

12. The non-transitory storage medium according to claim 10, wherein the method further comprises:
reading the thumbnails from the thumbnail storage of the storage system when the thumbnails corresponding to the indices are not found in the displayed thumbnail buffer and the thumbnails corresponding to the indices are found in the thumbnail storage; and
copying the thumbnails into the current thumbnail buffer.

13. The non-transitory storage medium according to claim 10, wherein the method further comprises:
sending a create thumbnail command to an image codec of the mobile device when the thumbnail corresponding to one of the indices is not found in the displayed thumbnail buffer nor the thumbnail storage; and
creating a thumbnail of a full image corresponding to the one of the indices by the image codec, and copying the created thumbnail created by the image codec into the current thumbnail buffer.

* * * * *